(12) United States Patent
Munda et al.

(10) Patent No.: US 12,395,841 B2
(45) Date of Patent: Aug. 19, 2025

(54) SYSTEM AND METHOD FOR ALLOCATION OR DEALLOCATION OF NAS STACKS TO IoT DEVICES

(71) Applicant: ACCENTURE GLOBAL SOLUTIONS LIMITED, Dublin (IE)

(72) Inventors: Surya Patar Munda, Bangalore (IN); Uday Govind Joshi, Bangalore (IN)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 408 days.

(21) Appl. No.: 18/113,946

(22) Filed: Feb. 24, 2023

(65) Prior Publication Data

US 2023/0292118 A1    Sep. 14, 2023

(30) Foreign Application Priority Data

Feb. 25, 2022    (IN) .............................. 202241010341

(51) Int. Cl.
*H04W 12/06* (2021.01)
*H04W 8/18* (2009.01)
*H04W 60/04* (2009.01)

(52) U.S. Cl.
CPC ............. *H04W 12/06* (2013.01); *H04W 8/18* (2013.01); *H04W 60/04* (2013.01)

(58) Field of Classification Search
CPC ....... H04W 12/06; H04W 8/18; H04W 60/04; H04W 4/70; H04W 12/35
See application file for complete search history.

(56) References Cited

U.S. PATENT DOCUMENTS

2013/0065557 A1* 3/2013 Zhang ................... H04W 12/04
455/411
2020/0367298 A1* 11/2020 Cakulev .................. H04W 8/08

FOREIGN PATENT DOCUMENTS

WO     WO-2022028880 A1 *  2/2022  ............ H04W 76/14

* cited by examiner

*Primary Examiner* — Brandon J Miller
(74) *Attorney, Agent, or Firm* — Mannava & Kang, P.C.

(57) ABSTRACT

The present invention discloses a system (100) and method for remote allocation and deallocation of NAS stacks to IoT devices (106). The system (100) comprises at least one user device (102) used by a user (104) to control at least one IoT device (106), a server (108), a base station (114) and a core network (116). Each IoT device (106) is configured to login to the server (108), upon which the server (108) allocates a remote NAS stack to the IoT device (106). The allocated remote NAS stack communicates with the core network (116) through the base station (114), and thus enables the IoT device (106) to utilize the cellular network as per 3GPP and become a 3GPP compliant device.

15 Claims, 7 Drawing Sheets

400

→ 402 Enabling login of at least one IoT device to the server, by using a NAS interface application → 404 Allocating a NAS stack to the IoT device → 406 Enabling the NAS stack to communicate with the core network through a base station → 408 Enabling the IoT device to utilize the core network, by using the allocated NAS stack

SYSTEM AND METHOD FOR ALLOCATION OR DEALLOCATION OF NAS STACKS TO IoT DEVICES

The following specification particularly describes the invention and the manner in which is to be performed:—

FIELD OF INVENTION

The field of invention generally relates to cellular radio communications. More specifically, it relates to a system and method for remotely allocating NAS stacks to internet of things (IoT) devices for accessing a cellular network core through the remote/cloud NAS stacks directly, without requiring a Radio Access Network (RAN).

BACKGROUND

Cellular telecommunication technology has been under constant evolution, from the earlier days of 1G-AMPS (Advanced Mobile Phone System) to 2G-GSM (Global System for Mobile communications) networks, to GPRS (General Packet Radio Service), to the modem system of UMTS (Universal Mobile Telecommunications System) to 4G LTE to 5G-NR. Along with access technologies, the services provided by the cellular telecommunications network have also been evolving.

As one of the representative cellular telecommunication standard organizations, the 3rd Generation Partnership Project (3GPP) has defined 5G Core with the introduction of Access and Mobility Function entity (AMF). A Non-Access Stratum (NAS) is a set of protocols in the AMF and the User Equipment (UE). The NAS is used to convey non-radio signaling between a user device and an AMF through 5G-NR Access.

In existing systems, internet of things (IoT) devices or IoT devices are equipped with NAS stack chips which are physically integrated in the devices. The NAS stack built into the IoT devices comprise multiple fractions such as Authentication, Security, Mobility, Session Management etc and sits on top of L1 and L2 layers. However, IoT devices comprise limited memory and hence the NAS stack with multiple layers may occupy maximum memory of the device. Therefore, an IoT device installed with a NAS stack results in reduced memory storage of the IoT device for required applications. Moreover, any IoT device with an integrated NAS stack enables the IoT device to communicate only with a particular assigned cellular network.

In addition, the NAS stack integration in to the IoT device requires considerable resources, including memory, physical space and connections within the IoT device, apart from necessary expertise and monetary resources required, which makes such devices expensive to design, build, buy, maintain, and repair.

Thus, in light of the above discussion, it is implied that there is a need for a system and method for allocating NAS stacks to the IoT devices, which solves the issue of IoT device size and memory and does not suffer from the problems discussed above.

OBJECT OF INVENTION

The principal object of this invention is to provide a system and method for allocating remote NAS stacks to IoT devices to enable communication of the NAS stack with a cellular network core, directly without a Radio Access Network (RAN), on behalf of the IoT device.

A further object of the invention is to provide a system and method for allocating the NAS stack to the IoT device without requiting the NAS stack to be physically integrated within the IoT device.

Another object of the invention is to provide a cost-effective solution for allocating the IoT device with remote NAS configuration.

Another object of the invention is to provide a system and method that enables communication of the IoT device with cellular networks of different generations as well as next generation cellular networks (3G, 4G, 5G, etc.) through the remote NAS stack.

A further object of the invention is to provide a system and method that facilitates increased memory storage, size and longer life of the IoT device due to the NAS stack being allocated remotely.

BRIEF DESCRIPTION OF FIGURES

This invention is illustrated in the accompanying drawings, throughout which, like reference letters indicate corresponding parts in the various figures.

The embodiments herein will be better understood from the following description with reference to the drawings, in which.

STATEMENT OF INVENTION

The present invention discloses a system and method for NAS stack allocation.

According to an aspect of the invention, the system comprises at least one user device which is interacted by at least one user, at least one IoT device which is controlled by the user device, a server, a communication network, a database, a base station and a core network. The IoT device is configured with a NAS interface protocol/application to register into the 3GPP core network for accessing a remote cellular network.

The server comprises NAS stacks and is configured to allocate and deallocate a NAS stack by creating and assigning an instance of the NAS stack to the at least one IoT device. The assigned NAS stack communicates with a core network through a base station for assigning the cellular network functions to the NAS stack. Thus, an IoT device which does not comprise any in-built NAS stack, can utilize the core network through the allocated NAS stack. In an embodiment, the NAS stacks correspond to 4G/5G/Future generation technology NAS stacks. Additionally, in case the IoT device does not comprise a SIM card, SIM credentials may be allocated to the IoT device, thus enabling SIM functionality on behalf of the IoT device.

Further, the server comprises an IoT device managing module, a non-access stratum (NAS) stack managing module and a SIM managing module. The IoT device managing module is configured to enable log-in/log-out of IoT devices into the server and track connection status of the IoT devices with the core network, which may be a 4G/5G/Future generation core network. The NAS stack managing module is configured to allocate and deallocate a instances of NAS stacks to the IoT devices. The SIM managing module manages allocation and deallocation of allocated SIM credentials to the NAS stacks of the IoT device.

DETAILED DESCRIPTION

The embodiments herein and the various features and advantageous details thereof are explained more fully with reference to the non-limiting embodiments that are illustrated in the accompanying drawings and/or detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The present invention discloses a system and method for automatic allocation and deallocation of remote NAS stacks to IoT devices and further enables access to cellular networks through the remote NAS stacks. The proposed system facilitates IoT devices with increased memory storage, as the NAS stack does not physically sit in the IoT device.

The proposed system further verifies the memory and processing capacity of the IoT devices to allow either direct installation of the NAS stack in the device or to remotely allocate an instance of the NAS-Stack to the device.

Figure 1:
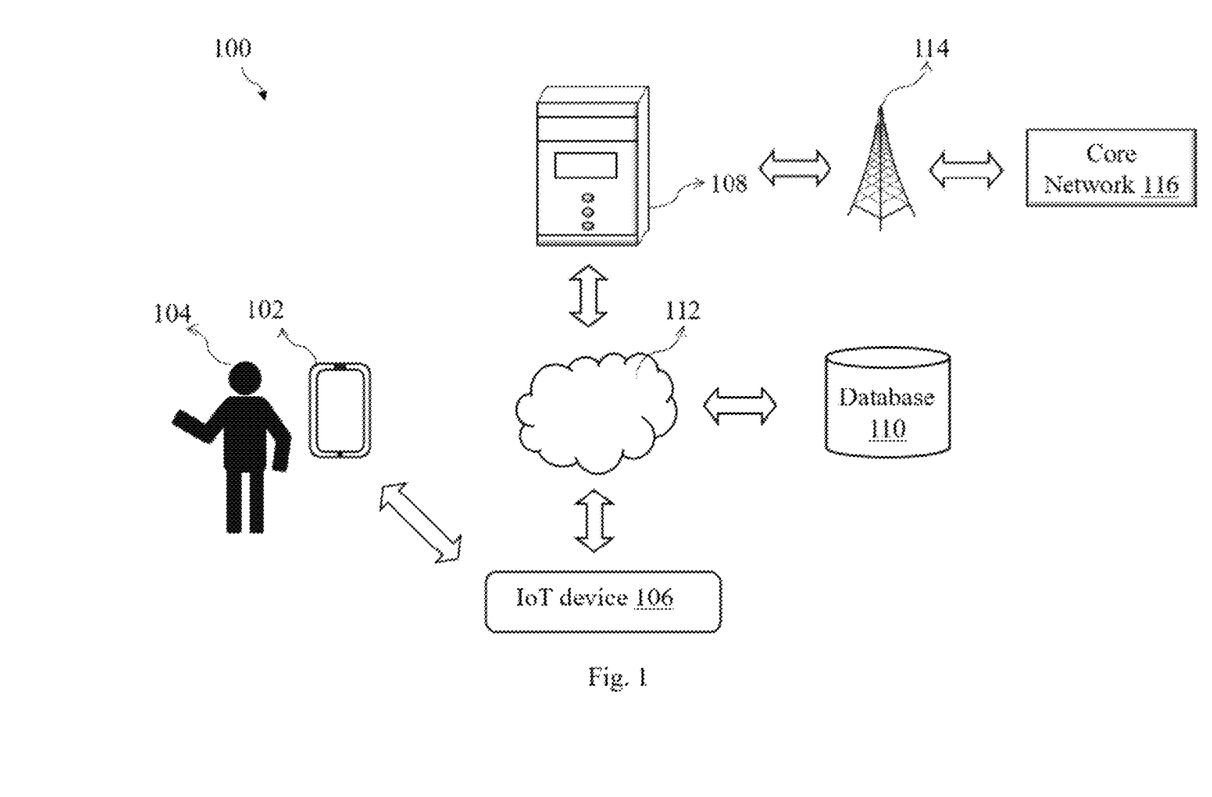
FIG. 1 depicts a block diagram of a system for allocating NAS stacks to IoT devices, in accordance with an embodiment.

FIG. 1 depicts a block diagram of a system 100 for allocating remote NAS stacks to IoT devices 106.

In an embodiment, the system 100 comprises at least one user device 102 which is interacted by at least one user 104, at least one IoT device 106 which is controlled by the user device 102, a server 108, a database 110, a communication network 112, a base station 114 and a core network 116.

In an embodiment, the IoT device 106 may comprise multiple IoT devices such as a first IoT device, a second IoT device and so on. Each IoT device 106 is configured to login into the server 108 for accessing a remote cellular network. The IoT device 106 is used by the user device 102 to issue commands through an application interface.

In an embodiment, the server 108 is equipped with various modules to allocate and deallocate a remote NAS stack to the IoT device 106 for accessing the remote cellular network. In an embodiment, the server 108 may comprise a pool of NAS stacks, or may be configured to create multiple instances of NAS stacks as required. Further, the server 108 is configured to remotely allocate the NAS stack to the IoT device 106, which eliminates physical installations of a NAS stack defined chip into the IoT device 106. Advantageously, the remote NAS stack allocation facilitates increased memory storage of the IoT device 106, as well as reduced costs, maintenance, repair and replacement. The user device 102, the IoT device 106, the server 108 and the database 110 communicate through a communication network 112.

In an embodiment, the server 108 enables direct installation or remote allocation of the NAS stack to the IoT device 106 based on various parameters of the IoT device 106. The parameters may be determined and analyzed by the server 108, which may comprise one or more of storage capacity, processing capability, type of the IoT device 106, SIM and NAS requirements of the IoT device 106 etc. In case the server 108 determines that parameters such as the storage capacity of the IoT device 106 comprises a predetermined sufficient storage value, the server 108 may proceed with the direct installation of the NAS stack within the IoT device 106. In case the server 108 determines that the parameters comprise less storage than the predetermined sufficient storage, the server 108 may proceed with remote allocation of the NAS stacks to the NAS device 106.

The NAS stack communicates with the core network 116 through the base station 114 for assigning the cellular network to the NAS stack. Thus, the IoT device 106 can access the cellular network through the allocated NAS stack.

In an embodiment, the database 110 is configured to store the processed data of the server 108 which comprises information related to the IoT devices 106, the NAS stacks which are assigned to the multiple IoT devices 106 and cellular networks which are assigned to the multiple NAS stacks.

The database 110 may comprise one or more of a local database or a remote database. The database 110 may comprise one or more volatile and non-volatile memory components which are capable of storing data and instructions to be executed, as well as various memories, comprising but not limited to a Random Access Memory (RAM) and a Read Only Memory (ROM).

In an embodiment, the database 110 may be used as a stand-alone device, or may be integrated fully/partially into at least one of the IoT device 106 and the server 108. The database 110 may also be distributed with one portion provided on the IoT device 106 and the other portion provided on the server 108. The database 110 may also be a cloud database that can be accessed through the communication network 112.

In an embodiment, the communication network 112 through which the IoT device 106, the server 108 and the database 110 communicate may be in the form of either a wired network, a wireless network, or a combination thereof. The wired and wireless communication may comprise but not limited to, GPS, GSM, LAN, Wi-fi compatibility, Bluetooth low energy as well as NFC, fibre optics and a mesh of routers etc. The wireless communication may further comprise one or more of Bluetooth (registered trademark), ZigBee (registered trademark), a short-range wireless communication such as UWB, a medium-range wireless communication such as WiFi (registered trademark) or a long-range wireless communication such as 3G/4G or WiMAX (registered trademark), LoRa etc, according to the usage environment.

The communication network 112 is capable of transmitting or receiving data to/from host computers, personal devices, telephones or any other electronic devices. The communication network 112 may comprise any software, hardware, or computer applications.

Figure 2:
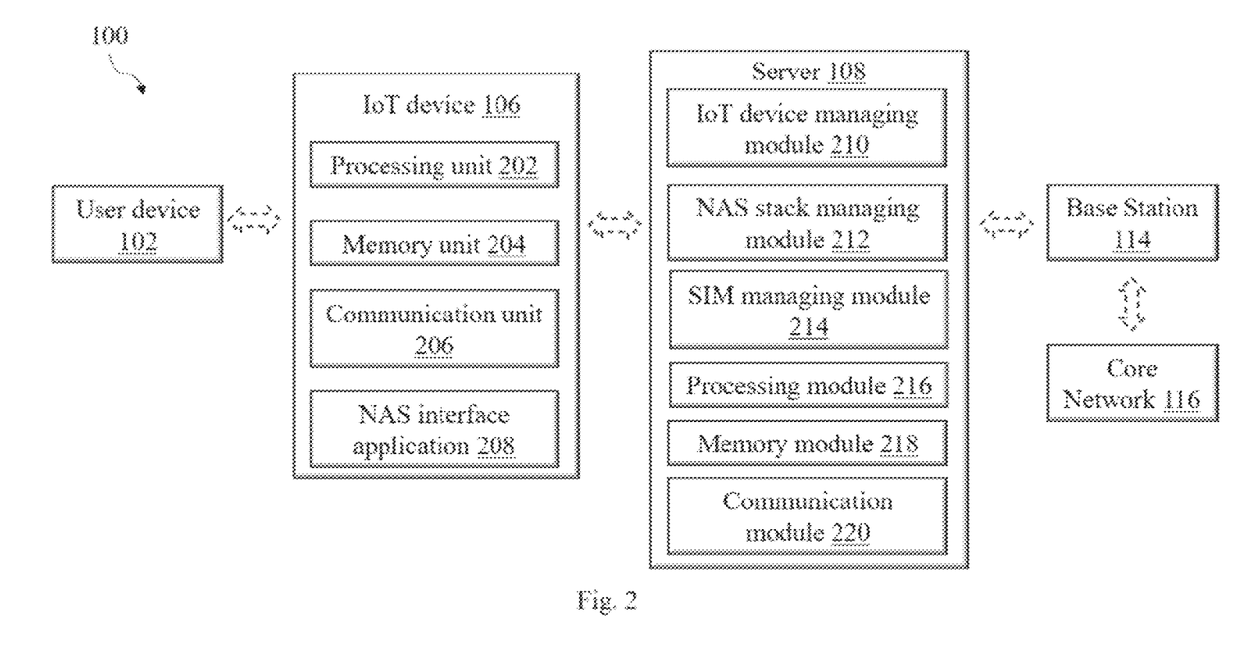
FIG. 2 illustrates components of the system for NAS stack allocation, in accordance with an embodiment.

FIG. 2 illustrates components of the system 100 for remote NAS stack allocation.

In an embodiment, the IoT device 106 comprises a processing unit 202, a memory unit 204, a communication unit 206 and a NAS interface protocol/application 208.

In an embodiment, the processing unit 202 may comprise one or more of microprocessors, circuits, and other hardware configured for processing. The processing unit 202 is configured to execute instructions stored in the memory unit 204 as well as communicate through an input/output module via the communication unit 206.

In an embodiment, the memory unit 204 comprises one or more volatile and non-volatile memory components which are capable of storing data and instructions to be executed.

In an embodiment, the communication unit 206 may include wired and wireless communication, including but not limited to, GPS, GSM, LAN, Wi-fi compatibility, Bluetooth low energy as well as NFC. The wireless communication may further comprise one or more of Bluetooth, ZigBee, a short-range wireless communication such as UWB, a medium-range wireless communication such as WiFi or a long-range wireless communication such as 3G/4G or WiMAX, according to the usage environment.

In an embodiment, the server 108 may comprise at least one hardware-based server or a cloud server. Further, the server 108 comprises an IoT device managing module 210, NAS stack managing module 212, a SIM managing module 214, a processing module 216, a memory module 218, and a communication module 220.

In an embodiment, the processing unit 202, the memory unit 204, and the communication unit 206 of the IoT device 106, and the processing module 216, the memory module 218, and the communication module 220 of the server 108 are similar in function.

In an embodiment, the NAS interface protocol/application 208 of the IoT device 106 is configured to interface with components of the server 108 to accomplish the remote NAS stack allocation to the IoT device 106.

In an embodiment, the NAS interface protocol/application 208 is configured to create multiple instances of the NAS stack, based on the number of logged in IoT devices 106. Further, the NAS interface protocol/application 208 is configured to allocate the instances of the NAS stack to each logged in IoT device 106.

In an embodiment, in case the IoT device 106 does not comprise the NAS interface protocol/application 208, the IoT device 106 is configured to download and install a plug-in software that facilitates interfacing through a NAS interface protocol/application 208. The plug-in software is designed flexibly with layers to enable communication of the IoT device 106 with the server 108, and to send commands to the server 108 such as log in request, reset, register, log out request, etc. The user device 102 may control the IoT device 106 through the plug-in software.

In an embodiment, the user device 102 may comprise a smart phone, a mobile device/phone, a Personal Digital Assistant (PDA), a computer, a workstation, a notebook, a mainframe computer, a laptop, a tablet, an internet appliance and any other computing device that is capable of controlling the IoT device 106. The user device 102 may utilize an application interface to communicate with and control the IoT device 106.

In an embodiment, the IoT device managing module 210 is configured to enable, record and manage log-in and log-out of multiple IoT devices 106 into the server 108. The IoT device managing module 210 enables the IoT devices 106 to log into the server 108 when required and tracks connection of the IoT devices 106 with the server 108 in real time.

In an embodiment, the NAS stack managing module 212 is configured to allocate a first NAS stack to a successfully logged in a first IoT device 106. The first NAS stack communicates with the core network 116 through the base station 114 for accessing the cellular network. Further, the NAS stack managing module 212 creates further instances of the NAS stack (such as a second NAS stack, third NAS stack, and so on) and allocates the subsequently created NAS stack instances to subsequent IoT devices 106 (such as a second IoT device 106, a third IoT device 106, and so on). The availability of creating further NAS stacks is determined by the NAS stack managing module 212 based on the remaining memory available in the server 108.

Thus, the NAS stack may communicate through the server 108 or the base station 114 to access the core network 116, without requiring a separate radio access network (RAN). This enables the IoT device 106 to utilize the core network without using any RAN such as a 4G or 5G RAN.

In an embodiment, the NAS stack managing module 212 determines various parameters of the IoT device 106, once the IoT is logged into the server 108 through the interface application 208. The NAS stack managing module 212 verities the storage capacity and type of the IoT device 106 based on the determined parameters. Further, the NAS stack managing module 212 either direct installs the NAS stack within the IoT device 106, or remotely allocates the NAS stack to the IoT device 106 based on the storage capacity and type of the IoT device 106.

In an embodiment, the NAS stack managing module 212 enables the user to manually download the NAS stack into the IoT device 106 using a plug-in software, which may be comprised within or outside the NAS interface application 208.

In an embodiment, the NAS stack managing module 212 may determine that parameters such as the storage capacity and type of the IoT device 106 comprises a predetermined sufficient storage value, the NAS stack managing module 212 may proceed with the direct installation of the NAS stack within the IoT device 106. In case the NAS stack managing module 212 determines that the parameters comprise less storage than the predetermined sufficient storage, the NAS stack managing module 212 may proceed with remote allocation of the NAS stacks to the IoT device 106.

In an embodiment, the SIM managing module 214 is configured to receive at least one SIM credential for the first NAS stack from the server 108. The SIM credential may comprise one or more unique identifiers and other parameters which enable for the SIM subscription. The server 108 transmits the SIM credential of at least one cellular network which comprises at least one of a 3G network, 4G network, 5G network and next generation networks. The SIM managing module 214 records and manages allocation and deallocation of the received SIM credential to the first IoT device 106.

In an embodiment, the SIM managing module 214 is configured to allocate the SIM credentials to IoT device 106 from a pool of SIM credentials. In case the entire pool of SIM credentials has been allocated, the SIM managing module 214 is configured to wait until an allocated SIM credential is released by any IoT device 106.

In an embodiment, the SIM managing module 214 tracks and transfers the allocated SIM credential to a second IoT device, in case of one or more scenarios such as: the pool of SIM credentials is already allocated, the first NAS stack deregisters from the cellular network, stops using the allocated SIM credential, or on expiry of SIM usage timeline allotted to the NAS stack.

In an embodiment, the SIM credential comprises at least one of a soft SIM credential or a virtual SIM credential, where each soft SIM credential can be shared among multiple NAS stacks based on their connection with the corresponding IoT device 106.

Figure 3:
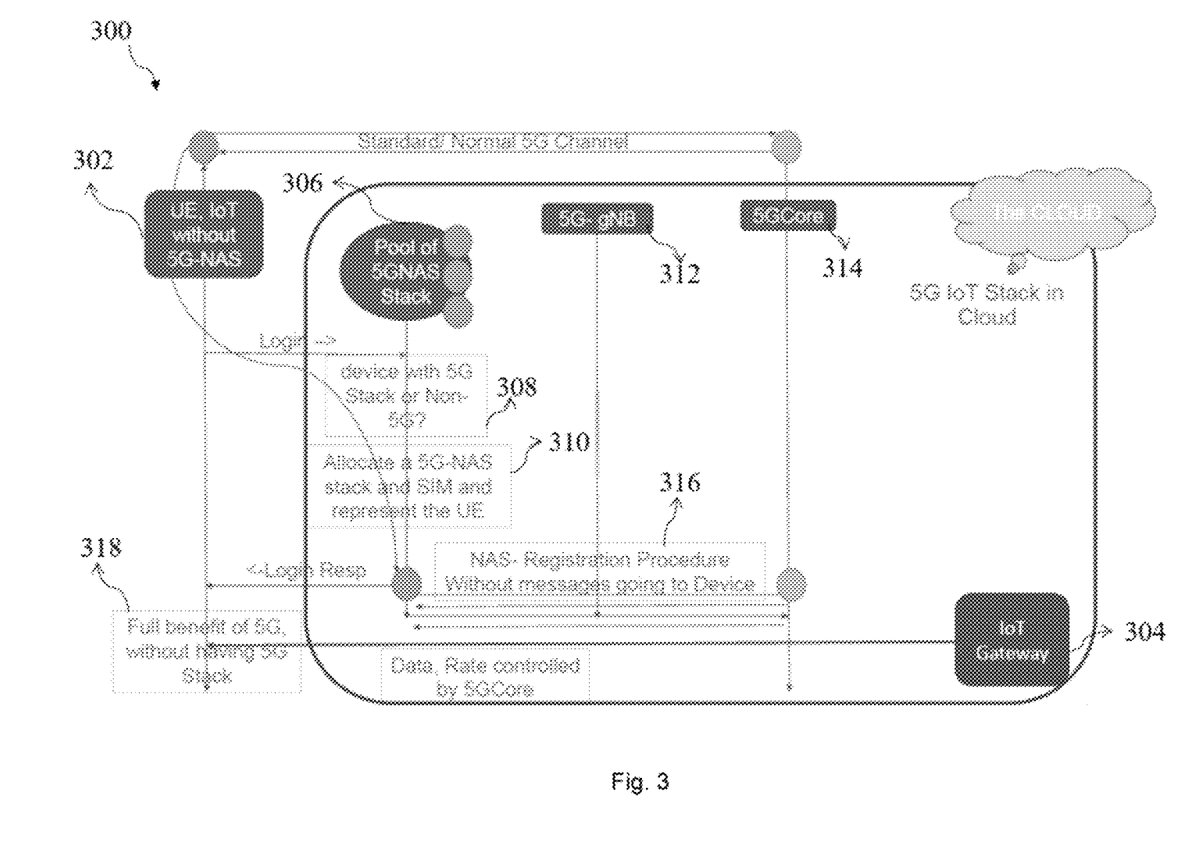
FIG. 3 illustrates an exemplary embodiment of a message sequence diagram for allocating the 5G NAS stack and enabling remote 5G network access for the IoT device, in accordance with an embodiment.

FIG. 3 illustrates an exemplary embodiment of a message sequence diagram 300 for allocating remote 5G NAS stack and enabling remote 5G network access for the IoT device 106.

In an embodiment, a User Equipment or an IoT device without 5G NAS stack is indicated as 302, which sends a login request to an IoT gateway 304. The IoT gateway 304 and server comprise of 5G IoT stacks and one or more other entities such as shared SIMs, among others. The IoT gateway 304 comprising a pool or instances of 5G-NAS stacks 306 determines whether the IoT device is compatible with 5G or non-5G, which is indicated at 308 after providing the log in response.

Further, after determining that the IoT device can be compatible with 5G as indicated at 308, a 5G NAS stack and SIM card credentials are allocated to the 5G NAS stack which represents the IoT device which is indicated at 310. The NAS stack communicates with a 5G core network 314 through a non-Radio 5G gNB 312. Thus, the server coordinates with the 5G gNB 312 through the standard protocols.

When data communication starts between the IoT device and the 5G core network 314, the data is passed through the IoT gateway 304. The IoT gateway 304 identifies one or more application requirements of the IoT devices and manages the data flow of the IoT devices.

The data from the IoT device passes through the data plane of the server, through the gateway software protocol i.e., GPRS Tunneling Protocol (GTP), and data plane of the 5G gNB 312. The GTP interfaces with the 5G core network 314. Thus, 5G Core can be accessed through standard protocols such as GTP which is a data standard protocol and Next Generation Protocol (NGP) which is a control standard protocol.

Further, the control plane of the 5G gNB 312 manages the parameters such as registration, permission, security etc. of the IoT device, and the data plane of the 5G gNB 312 allows the data flow from the IoT gateway 304.

The 5G core network 314 records the 5G SIM credential associated with the 5G NAS stack of the IoT device, for completing the NAS registration procedure with the 5G network. Thus, the NAS registration procedure with the 5G core 314 is carried out without sending messages to the IoT device which is indicated at 316. Therefore, the IoT device is advantageously benefitted from the 5G network access without requiring the 5G NAS stack to be integrated into the IoT device, as indicated at 318.

It is to be noted that FIG. 3 may be implemented for any type of network including but not limited to, 3G, 4G, 5G, cellular networks, etc.

Figure 4:
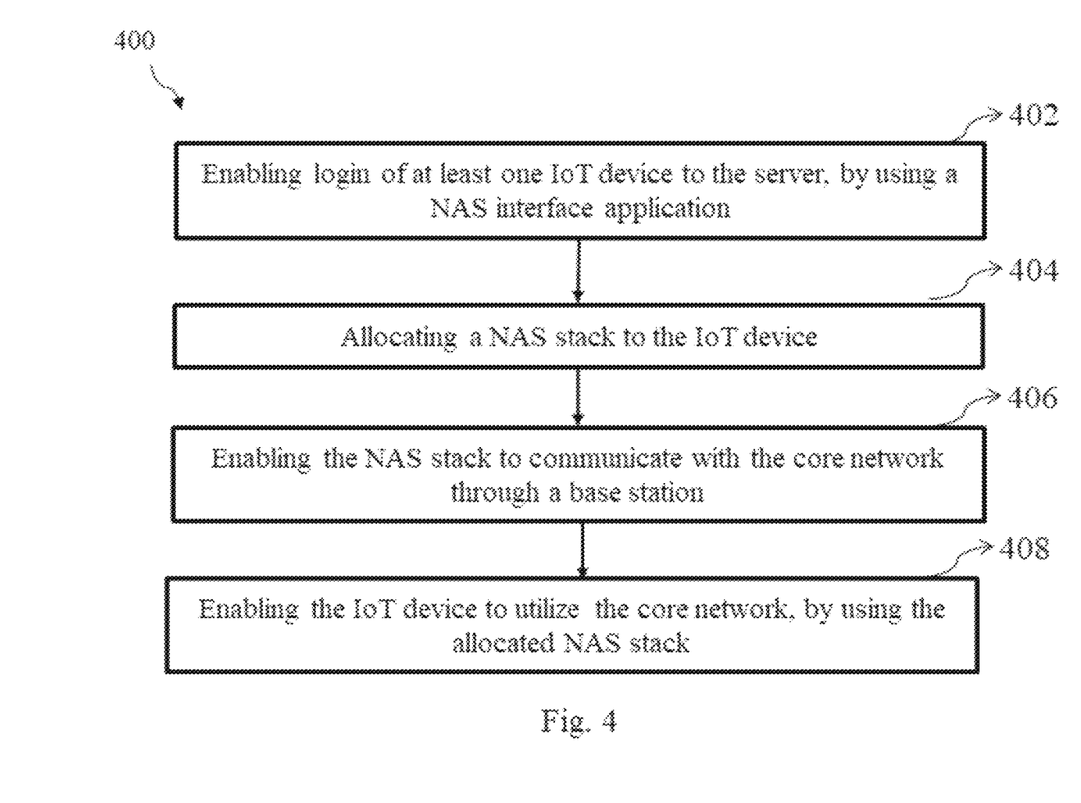
FIG. 4 illustrates a method for allocating NAS stack and assigning a cellular network, in accordance with an embodiment.

FIG. 4 illustrates a method 400 for allocating remote NAS stacks and assigning a cellular network. The method 400 begins with enabling login of at least one IoT device into a server through a NAS interface application, as depicted at step 402. The IoT device is logged-in for accessing the remote cellular network. Subsequently, the method 400 discloses allocating a NAS stack to the IoT device, from the server, as depicted at step 404. In case further IoT devices log in to the server, further NAS stack instances are created and allocated to the IoT devices, by the server.

Thereafter, the method 400 discloses enabling the NAS stack to communicate with the core network through the base station for accessing the cellular network, as depicted at step 406. Further, the method 400 discloses enabling the IoT device to utilize the core network by using the allocated NAS stack, as depicted at step 408.

Figure 5:
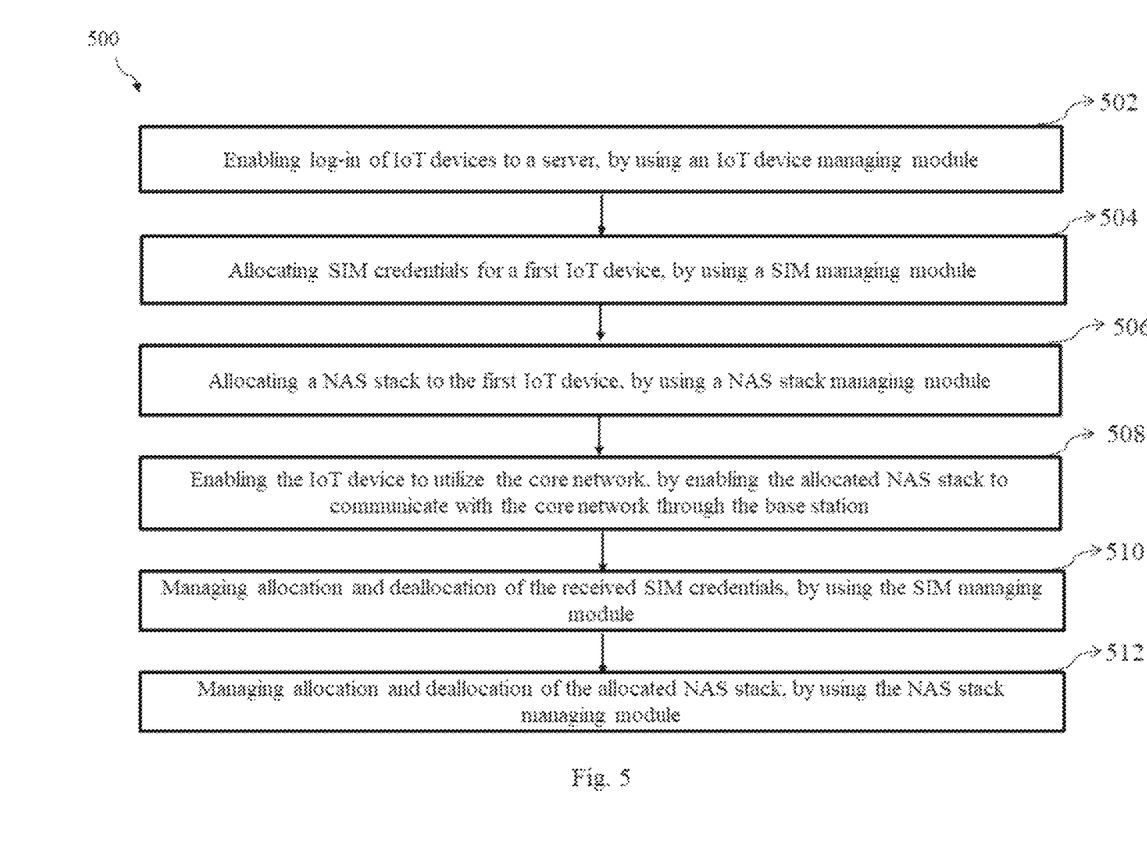
FIG. 5 illustrates a method for allocating SIM credentials and NAS stacks, in accordance with an embodiment.

FIG. 5 illustrates a method 500 for allocating SIM credentials and remote NAS stacks, according to an embodiment. The method 500 begins with enabling log-in of IoT devices into the server, by using an IoT device managing module, as depicted at step 502. Further, the method 500 discloses allocating SIM credential for a first IoT device, by using the SIM managing module, as depicted at step 504.

Subsequently, the method 500 discloses allocating a NAS stack to the first IoT device by using the NAS stack managing module, as depicted at step 506. The first IoT device is allocated with the first NAS stack after the first IoT device logs into the server.

Thereafter, the method 500 discloses enabling the IoT device to utilize the core network, by enabling the allocated NAS stack to communicate with the core network through the base station, as depicted at step 508.

Further, the method 500 discloses managing allocation and deallocation of the received SIM credentials by using the SIM managing module, as depicted at step 510. Subsequently, the method 500 discloses managing allocation and deallocation of the allocated NAS stack by using the NAS stack managing module, as depicted at step 512.

Figure 6:
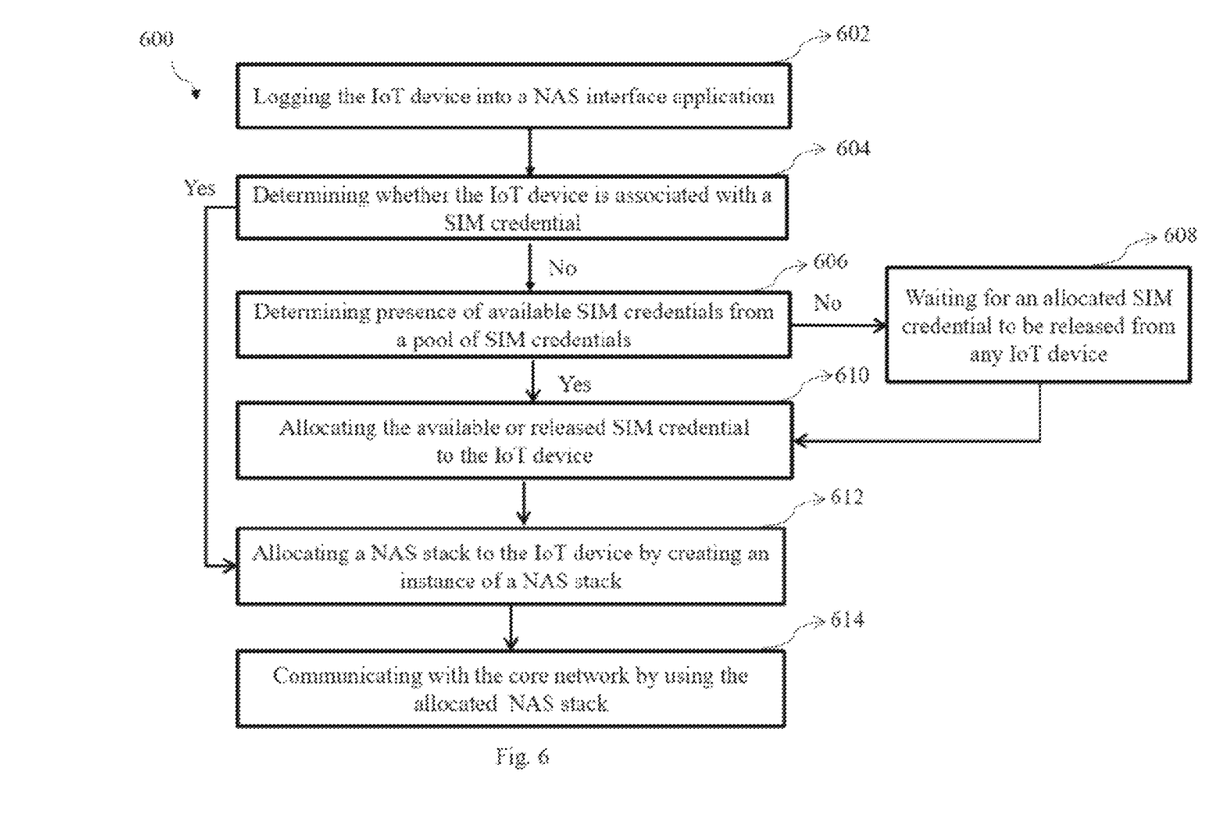
FIG. 6 illustrates a method for determining and allocating SIM credentials and remote NAS stacks, in accordance with an embodiment.

FIG. 6 illustrates a method 600 for determining and allocating SIM credentials and remote NAS stacks, according to an embodiment. The method 600 begins with logging at least one IoT device into the server by using a NAS interface application in the IoT device and an IoT device managing module in a server, as depicted at step 602. Subsequently, the method 600 discloses determining whether the IoT device is associated with a SIM credential, as depicted at step 604, by using a SIM managing module. In case the IoT device has a SIM card, the method proceeds to step 612. In case the IoT device does not have a SIM card, the method 600 discloses determining the presence of available SIM credentials from a pool of SIM credentials, as depicted at step 606. In case there are available SIM credentials, the available SIM credential is allocated to the IoT device, as depicted at step 610. In case SIM credentials are unavailable, the method 600 comprises waiting for an allocated SIM credential to be released from any IoT device, as depicted at step 608. Thereafter, the released SIM credential is allocated to the IoT device, as depicted at step 610. Subsequently, the method 600 discloses allocating a NAS stack to the IoT device by creating an instance of a NAS stack, as depicted at step 612, by using the NAS stack managing module.

Thereafter, the method 600 discloses communicating with the core network by using the allocated NAS stack, as depicted at step 614.

Figure 7:
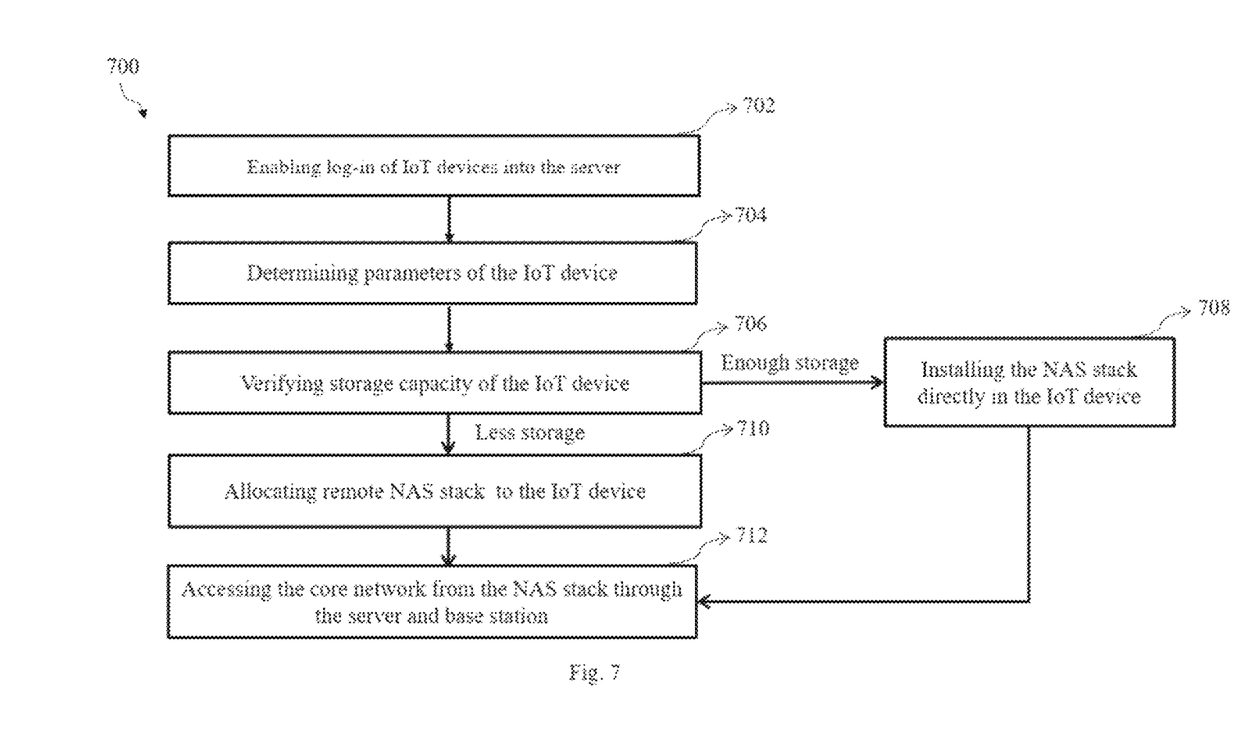
FIG. 7 illustrates a method for assigning a cellular network to the IoT device through direct installation or remote allocation of the NAS stack to the IoT device, in accordance with an embodiment.

FIG. 7 illustrates a method 700 for assigning a cellular network to the IoT device through direct installation or remote allocation of the NAS stack to the IoT device, in accordance with an embodiment.

The method 700 begins with log-in of the IoT device into the server, as depicted at step 702, by using a NAS interface application. Thereafter, the parameters of the IoT device are determined by the server, as depicted at step 704. The parameters determined by the server may comprise one or more of storage capacity, processing, capability, type of the IoT device, SIM and NAS requirements of the IoT device etc.

Subsequently, the method 700 comprises verifying the storage capacity of the IoT device, as depicted at step 706. Further, the method 700 comprises installing the NAS stack directly in the IoT device, as depicted at step 708, in case there is enough storage capacity of the IoT device. Alternatively, the method 700 comprises else allocating the NAS stack remotely to the IoT device, as depicted at step 710, by creating an instance of the NAS stack in the server in case of less storage in the IoT device.

In an embodiment, the NAS stack can be directly downloaded from the server and can be installed manually in the IoT device. The NAS stack may be downloaded using plug-in software which may be configured in the IoT device. This may avoid any delay of downloading the NAS stack while login.

Thereafter, the NAS stack communicates through the server or the gNB or the base station to access the core network, as depicted at step 712, without requiring a separate Radio Access Network (RAN). This enables the IoT device to utilize the core network without any 4G or 5G RAN.

Thus, a need for a 4G or 5G or next generation tower or radio network can be eliminated, for connecting to the core 4G, 5G or any next generation network. Advantageously, this provides enormous benefits for enabling IoT devices in any geographical area to connect and use the core network. Additionally, this advantage provides extensive economic benefits which can overcome a scarcity of 4G or 5G or next generation networks. Therefore, remote areas which do not have any radio tower facility may be provided with 4G or 5G core connectivity or other generation connectivity, by using any wireless access network means.

Further, a network management system may be configured in the server which may identify and correct any configuration or network issues. Thus, the method 700 allows the NAS stack to be used either physically in the IoT device itself or remotely in the server, based on the storage capacity of the IoT device.

The advantages of the current invention comprise an advanced system for remote NAS stack allocation with more economical use of memory and efficiency strategies. The system enables the IoT device communication to communicate with the cellular network through the remote NAS stack. The system provides a cost effective solution for the IoT device with the provision of remote NAS configuration.

The additional advantages comprise, where the system facilitates the IoT device with increased memory storage, size and longer life as the NAS stack is remotely allocated. The system works with any software having multi-threading and multi-processing and may be ported to any operating system versions. The user device may utilize any application software for managing multiple IoT devices.

Applications of the current invention comprise healthcare IoT, home automation IoT and other types of IoT applications where the IoT devices with or without SIM cards may access remote NAS stacks and remote cellular networks. Further, various cellular networks may be allocated to the IoT device remotely such as 3G, 4G, 5G and other next generation networks, thus making the normal IoT device as 3G compatible, 4G compatible, 5G compatible and so on.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described here.

We claim:

1. A system (100) for allocating and deallocating non-access stratum (NAS) to at least one IoT device (106), comprising:
    at least one remote NAS stack enabled to communicate with a cellular network;
    the at least one IoT device (106) comprising a NAS interface application (208) configured to communicate with a server (108), wherein the NAS interface application (208) enables the IoT device (106) to access a cellular network; and
    the server (108) configured to allocate or deallocate at least one NAS stack to the at least one IoT device (106), and wherein the NAS stack communicates with a core network (116) for registering and communicating with the cellular network, on behalf of the at least one IoT device (106).

2. The system (100) for allocating non-access stratum (NAS) as claimed in claim 1, wherein the server (108) comprises:
    a IoT device managing module (210) configured to enable log-in and log-out of the IoT device (106) with the server (108) and track connections between the IoT device (106) and the server (108);
    a non-access stratum (NAS) stack managing module (212) configured to allocate or deallocate the remote NAS stack to the IoT device (106), wherein the remote NAS stack communicates with the core network (116) through a base station (114), for assigning the cellular network to the remote NAS stack; and
    a SIM managing module (214) configured to allocate at least one SIM credential to the IoT device (106), and manage allocation and deallocation of the allocated SIM credentials, based on a connection of the NAS stack with the IoT device (106).

3. The system (100) for allocating NAS as claimed in claim 2, wherein the core network (116) directly validates the SIM credential of the IoT device (106) for utilizing at least one cellular network comprising at least one of a 2G network, 3G network, 4G network, 5G network and next generation networks.

4. The system (100) for allocating NAS as claimed in claim 2, wherein the NAS stack managing module (212) allocates the remote NAS stack to each subsequent logged-in IoT device (106) by creating one or more instances of the remote NAS stack in the server (108).

5. The system (100) for allocating NAS as claimed in claim 2, wherein the SIM managing module (214) allocates at least one SIM credential to the IoT device (106) from a pool of SIM credentials.

6. The system (100) for allocating NAS as claimed in claim 2, wherein the at least one SIM credential comprises at least one of a soft SIM credential or a virtual SIM credential, where the at least one SIM credential is shared with at least one NAS stacks based on their connection with the corresponding IoT device (106).

7. The system (100) for allocating NAS as claimed in claim 2, wherein the server (108) is configured to determine and analyze parameters of the IoT device (106), and wherein the server (108) is configured to allocate or deallocate at least one NAS stack to the at least one IoT device (106) through direct installation or remote allocation of the NAS stack, based on a predetermined sufficient storage value of the IoT device (106); and wherein the direct allocation enables the NAS stack to reside in the IoT device (106), based on at least one of predetermined sufficient storage value and type of IoT Device (106).

8. A method for allocating and deallocating non-access stratum (NAS) to at least one IoT device (106), comprising:
- communicating with a cellular network, by using at least one remote NAS stack;
- enabling at least one IoT device (106) to access a cellular network, by using a NAS interface application (208) comprised in the IoT device (106) to communicate with a server (108);
- allocating or deallocating at least one NAS stack to the at least one IoT device (106), by using the server (108); wherein the NAS stack communicates with a core network (116) for registering and communicating with the cellular network, on behalf of the at least one IoT device (106).

9. The method for allocating non-access stratum (NAS) as claimed in claim 8, comprising:
- enabling log-in and log-out of the IoT device (106) with the server (108) and tracking connections between the IoT device (106) and the server (108), by using an IoT device managing module (210);
- allocating or deallocating the remote NAS stack to the IoT device (106), wherein the remote NAS stack communicates with the core network (116) through a base station (114) for assigning or connecting the cellular network to the NAS stack, by using a non-access stratum (NAS) stack managing module (212); and
- allocating at least one SIM credential to the IoT device (106) and managing allocation and deallocation of the allocated SIM credentials, based on a connection of the remote NAS stack with the IoT device (106), by using a SIM managing module (214).

10. The method for allocating non-access stratum (NAS) as claimed in claim 9, comprising validating the SIM credentials of the IoT device (106) for at least one cellular network comprising at least one of: a 2G network, 3G network, 4G network, 5G network and next generation networks, by using the core network (116).

11. The method for allocating non-access stratum (NAS) as claimed in claim 9, comprising:
- creating an instance of the NAS stack in the server (108); and
- allocating the NAS stack to each subsequent logged-in IoT device (106), by using the NAS stack managing module (212).

12. The method for allocating non-access stratum (NAS) as claimed in claim 9, comprising:
- allocates at least one SIM credential to the IoT device (106) from a pool of SIM credentials, by using the SIM managing module (214).

13. The method for allocating non-access stratum (NAS) as claimed in claim 9, wherein the at least one SIM credential comprises at least one of a soft SIM credential or a virtual SIM credential, and wherein the at least one SIM credential is shared with at least one specific NAS stacks based on their connection with the corresponding IoT device (106).

14. The method for allocating non-access stratum (NAS) as claimed in claim 8, comprising:
- determining and analyzing parameters of the IoT device (106) by the server (108);
- verifying at least one of storage capacity and type of the IoT device (106) by the server (108);
- installing the NAS stack directly in the IoT device (106), in case there is a predetermined sufficient storage;
- allocating a remote NAS stack to the IoT device (106), by creating an instance of the NAS stack in the server (108) in case there is less storage than the predetermined sufficient storage; and
- accessing the core network by the NAS stack through the server (108) without requiring a separate radio access network.

15. A method for determining and allocating SIM credentials and NAS stacks by using a server (108), comprising:
- logging in at least one IoT device (106) into the server (108) by using a NAS interface application (208) in an IoT device (106) and an IoT device managing module (210) in a server (108);
- determining whether the IoT device (106) is associated with a SIM credential;
- determining the presence of available SIM credentials from a pool of SIM credentials;
- waiting for an allocated SIM credential to be released from any IoT device (106);
- allocating an available or released SIM credential to the IoT device (106);
- allocating a NAS stack to the IoT device (106) by creating an instance of the remote NAS stack; and
- communicating with the core network (116) by using the allocated remote NAS stack.

\* \* \* \* \*